United States Patent [19]

Baltensperger et al.

[11] Patent Number: 5,303,870
[45] Date of Patent: * Apr. 19, 1994

[54] METHOD FOR THE PRODUCTION OF MILLED GRAIN PRODUCTS AND GRAIN MILLING SYSTEM

[75] Inventors: Werner Baltensperger, Oberuzwil; Christian Lippuner, Niederuzwil, both of Switzerland

[73] Assignee: Buehler AG, Uzwil, Switzerland

[ * ] Notice: The portion of the term of this patent subsequent to Nov. 24, 2009 has been disclaimed.

[21] Appl. No.: 52,868

[22] Filed: Apr. 23, 1993

Related U.S. Application Data

[63] Continuation of Ser. No. 728,621, Jul. 11, 1991, abandoned, which is a continuation of Ser. No. 350,557, Mar. 22, 1989, Pat. No. 5,100,062.

[30] Foreign Application Priority Data

Oct. 6, 1987 [CH] Switzerland .................... 03893/87
Oct. 6, 1988 [WO] PCT Int'l Appl. .................. PCT/CH88/00184

[51] Int. Cl.$^5$ .............................................. B02C 9/04
[52] U.S. Cl. ............................................. 241/9; 241/13; 241/159
[58] Field of Search ................ 426/518; 241/6–13, 241/24, 29, 79, 78, 159, 135, 143

[56] References Cited

U.S. PATENT DOCUMENTS

| | | | |
|---|---|---|---|
| 453,364 | 6/1891 | Taylor | 241/9 X |
| 798,267 | 8/1905 | Cron | 241/11 X |
| 1,287,654 | 12/1918 | Dodds | 241/11 |
| 4,220,287 | 9/1980 | Boczewski | 241/9 |
| 4,572,441 | 2/1986 | Sangati | 241/135 X |
| 4,881,689 | 11/1989 | Lippuner et al. | 241/9 |
| 5,031,845 | 7/1991 | Gemsjager | 241/13 X |
| 5,100,062 | 3/1992 | Baltensperger et al. | 241/9 |
| 5,165,608 | 11/1992 | Baltensperger et al. | 241/9 |
| 5,201,470 | 4/1993 | Baltensperger et al. | 241/13 |

FOREIGN PATENT DOCUMENTS 389125   9/1908   France .................... 241/11

Primary Examiner—Mark Rosenbaum
Assistant Examiner—Frances Chin
Attorney, Agent, or Firm—McAulay, Fisher, Nissen, Golberg & Kiel

[57] ABSTRACT

The invention is directed to a new method for producing milled grain products such as flour, semolina, middlings, etc., wherein the material is repeatedly ground by means of rolls and sifted with the system of advanced milling. It is suggested that the material be guided again at least twice via double-roll grinding stages with sifting between the double grindings, wherein the material is sifted in each instance following the double grinding. In an especially preferred manner, a corresponding new mill with at least two double-grinding passes is preferably constructed as an 8-roll mechanism (70). In an especially preferred manner. The new mill comprises a combination of eight- (70) and four-roll mechanisms (142, 151). A screening surface which is at least 20 to 50% larger is used for the double grinding.

11 Claims, 6 Drawing Sheets

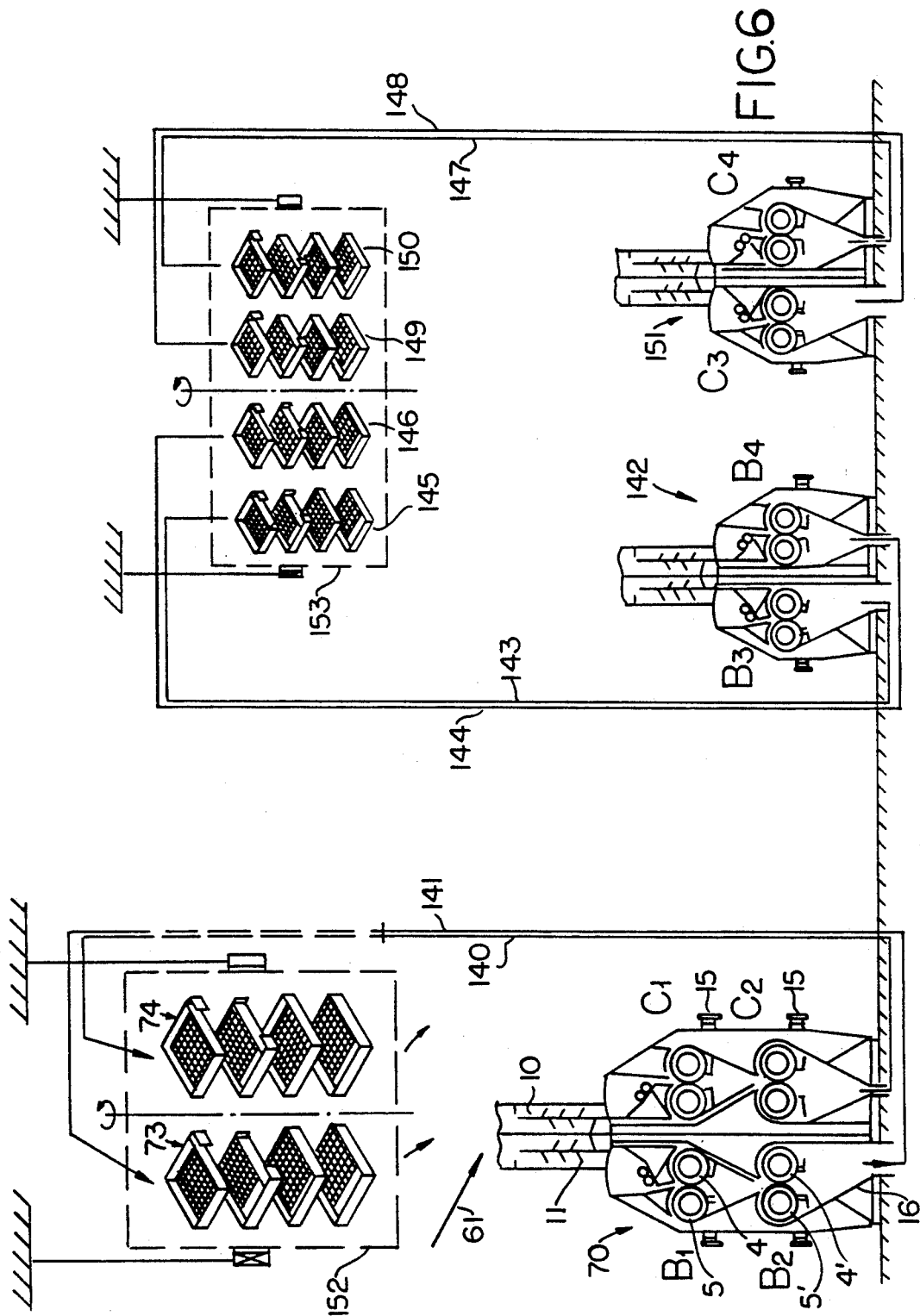

METHOD FOR THE PRODUCTION OF MILLED GRAIN PRODUCTS AND GRAIN MILLING SYSTEM

This is a continuation of application Ser. No. 07/728,621, filed Jul. 11, 1991 now abandoned, which is a continuation of Ser. No. 350,557 filed Mar. 22, 1989 now U.S. Pat. No. 5,100,062 granted Mar. 31, 1992.

TECHNICAL FIELD

The invention is directed to a method for the production of milled grain products such as flour, semolina, middlings wherein the material is repeatedly ground with rolls and sifted with the system of advanced milling.

BACKGROUND ART

In commercial and industrial grain processing there is a strong tendency observable today which appears to be at least partially directed to the past. This is the demand for high-value basic foodstuffs which, with grain, is equated in an almost symbolic manner with the flour produced on grinding stones and the whole-grain bread which is baked from it. In this connection, the objection is raised more or less that the milling industry, as the interface between agriculture on the one hand and the baker and consumers on the other hand, has developed down the wrong path, since the final products either no longer contain important constituents or the latter are contained in impaired form. However, this opinion—which is a result of an excessive division of labor and the consequent modern scientific "division of thought-"—overlooks some fundamental facts:

- offering good foodstuffs within the framework of prevailing eating habits; it is left to the consumer, for example, to decide which foodstuffs he wants to draw his bulk material from.
- the preparation of foodstuffs with the least possible losses during processing,
- the economical processing of foodstuffs, which, in particular, is also given energetic consideration,
- favorable preparation with respect to physiologically oriented nutrition, so that the foodstuffs can be made use of as completely as possible by humans and animals, that is, with the least possible losses,
- a good cleaning of the foodstuffs and a hygienically unobjectionable processing, e.g. also with respect to harmful bacteria, fungi, etc.,
- offering a multitude of different foodstuffs based on the same raw grain.

Whole-grain and integral/dark flour was produced, according to the old stone grinding principle, by means of grinding the entire kernel one or more times and possibly sifting out a portion of the hulls or the outermost layers of the kernel. It cannot be disputed that this system, also known as flat milling, which was still widespread several decades ago, has the advantage that almost all constituents of the grain remain integral in the flour or bruised grain and afford a high-value nutrition for humans by way of bread and other grain products. However, this oldest method also has disadvantages. The products produced from integral grinding have only a limited storage life, particularly when improperly stored, for two basic reasons. The corresponding "health products" are usually intended for immediate consumption. On the other hand, dirt, bacteria, fungus spores, etc. usually adhere only to the outside of the kernel. But, it is precisely the latter which destroy the quality of the products and reduce their storage life or would cause the milled products to rot after a short storage period under bad conditions.

The fact that the grain kernel comprises very distinct parts is often overlooked. Individually, the various parts of the grain kernel give the milled products, i.e. flour, semolina, middlings, feed meal, bran, specific properties, e.g. specific baking characteristics. Such products (semolina for dough products, white flour, etc.), which are required for a specific purpose can only be partially separated with integral grinding or with the flat milling method. It is only so-called advanced milling which allows the production of the multitude of milled products required in presently prevailing eating habits while adhering to the conditions and basic facts listed above.

Depending on which parts of the interior of the kernel are made use of and combined, respectively, for the flour, the end product can be given a very particular aroma (whole-grain bread, medium-white bread, pastry and cake products, etc.). But advanced milling, in particular, allows every separately occurring fraction to be combined again to form a flour, that is, e.g. also to form whole-grain flour, or to be mixed with a flour with increased protein content or even with a flour with more germ content. The system of advanced milling accordingly allows a substantially more goal-oriented preparation of the kernel. By analogy, "integral chopped-meat" is not produced from a carcass in the case of meat either.

Accordingly, in so-called industrial society, the advanced milling method offers many advantages, of which little use has been made so far. A medium-size mill with relatively few operating personnel has a daily production of e.g. 100–200 tons of finished product. The old stone mill with one man has a daily production of 100 to 200 kg.

The advanced milling known is characterized by a repeated grinding and sifting after every grinding pass. This applies to soft wheat and hard wheat as well as to corn milling. Until two or three decades ago, this process was often repeated 15 to 20 times. But the most recent developments have proven that grinding an average of twelve to fifteen times with proper management leads to the same results. Since the beginning of the seventies, the short advanced milling method, in comparison to the previous long grinding, has become state of the art in advanced milling throughout almost the entire world.

A good miller is capable of achieving the standard of quality demanded by industries receiving the product for further processing, e.g. bakers, dough products factories, etc., even from sharply diverging raw materials by means of mixing the different grain qualities and appropriate milling, particularly by means of very carefully opening the various parts of each kernel of grain in stages.

It is a known fact that, in order to remain competitive, the mill must produce a certain quantity of high-quality, and accordingly also high-price end products from a certain quantity of raw materials. That is, a grain mill constantly strives to achieve a high yield of light flour, semolina, etc. A mill operates well only when it adheres to the quality criteria. An important aspect of the overall economic efficiency is the scope of required machinery, which, in a mill, depends e.g. directly on the quantity of grinding and sifting passes. All recent efforts have shown that grinding cannot be further reduced in advanced milling without directly reducing either the yield or the quality of the milled product, so that an actual stagnation has been observable in the development of the grinding process in milling for some years in this respect.

SUMMARY OF THE INVENTION

The invention has as an object of developing a new advanced milling method in which the economic efficiency of the mill is improved while nevertheless completely maintaining the flexibility and adaptability of the mill to the respective specific milling work, the quality of the final products, as well as the monitoring of the mill.

The solution, according to the invention, is characterized in that the material is guided at least twice through double-roll grinding passes without sifting between the double grindings and is sifted subsequent to the double grinding.

A first series of tests with the new method, according to the invention, has confirmed to the surprise of all participating persons trained in the field that the proposed object could be met in its entirety. In observing these tests, however, it was interesting to note that a threefold grinding without intermediate sifting, as was practiced to some extent in early modern milling, produced significantly inferior results. With presently required milling capacities, this can be traced back in part to excessive heating of the material, but most probably to the fact that in a threefold grinding without intermediate sifting a considerably larger portion of the material to be ground is reduced in size in a disadvantageous manner or that an excessive portion of fine material is produced at a premature stage. Herein lies probably one of the most important secrets of mill grinding, namely that every work step is carried out so that it can be monitored and overseen individually. The experienced chief miller knows what he is doing at every stage. Therefore, in practice, special conditions are created at every stage of grinding, e.g. by means of adjusting the grinding gap, special corrugation, differential of the grinding rolls, throughput through a grinding pass, the diagrammatic guidance in the mill, etc.

It has turned out to be very important that every grinding pass remain capable of being monitored and also adjusted, that is, also both grindings of the double-grinding passes individually. But the access necessary in practice is retained with the new solution, at least with respect to the grinding. Milling remains what it has always been for any good miller, a craft in which he is also responsible for managing the sequence of milling operations with all his human faculties.

It has proven particularly advantageous that the material be ground by means of double grinding and single grinding in combination, wherein the material to be milled is sifted after every double-grinding pass and every single-grinding pass.

It is especially preferable that at least the first and second bruised grain ($B_1$ and $B_2$), as well as the first and second reduction ($C_1$ and $C_2$), be guided through a double grinding in each instance without intermediate sifting.

It is possible to guide the material four to six times by way of double-grinding stages without sifting between the double grindings and then to sift it following the double grinding.

Particularly for the reduction, also, this allows double-grinding passes and a combination of two to six single grindings to be carried out with an intermediate sifting in each instance.

However, this showed that the advantages of the invention could be made use of with the new advanced milling method for every specific case "more or less", and, for example, a reduction in costs for operation of the system of 10 to 30% relative to the prior art is thus made possible.

The new invention also concerns a grain mill for producing milled grain products such as flour, semolina, middlings, etc. with the system of advanced milling which comprises a plurality of grinding passes with roll pairs and subsequent sifting passes with plansifters and sifter divisions, respectively.

This new grain mill is characterized in that it has at least two double-grinding passes with two grinding roll pairs arranged one behind the other in each instance without sifting between the two roll pairs.

The new grain mill is sharply distinguished from the previous grain mill particularly in terms of construction, in that a substantial concentration of labor is now made possible.

In an especially preferred manner, the new grain mill is constructed as an 8-roll mill with two double-grinding passes as a roll mill unit in each instance and two grinding roll pairs, in each instance, which are located one on top of the other.

A new possibility for monitoring for the miller is now also created in the form of the eight-roll mill, in that two grinding stages can be overseen directly at the same time and in the same place. This means that a change e.g. in the first pair of grinding rolls, as well as in the second pair of grinding rolls, and also the influence of the change in the first pair of grinding rolls on the grinding results of the second pair of grinding rolls, which may be unchanged as the case may be, can be appraised immediately. To the knowledge of the present Applicant, this has never been possible previously in the field of advanced milling. Because sifting was carried out between every grinding, not only was it necessary in the prior art to wait a corresponding period of time until the material had passed the sifting and the second grinding stage, but the composition of the material to be milled was also changed as a result of every intermediate sifting in that individual fractions were guided to different passes. It has been shown that the slight disadvantage, that a small portion is reduced in size unnecessarily in the second grinding, is more than compensated for by the advantage of the possibility of direct monitoring as well as immediate accessibility to both grinding roll pairs.

The best solution at present consists in using a combination of double-grinding passes and single-grinding passes with a sifting pass after every double-grinding pass or single-grinding pass.

In an especially preferred manner, both eight-roll mills and four-roll mills are used in combination.

It is suggested, in addition, that at least two eight-roll mills are provided, wherein every grinding roll pair has its own grinding gap adjustment.

In the eight-roll mills, an adjustable feed regulation is assigned to the roll pairs located on top, and a funnel-shaped product guide is arranged for directly transferring from the respective roll pair at the top to the lower roll pair, wherein grinding gap adjusting devices and a control gate for the removal of samples after every grinding pass should be assigned to every roll pair.

In addition, both the feed space of the upper roll pair and the feed space of the lower roll pair are preferably connected to an aspirating device via ducts.

In accordance with the demands of mill grinding, it is further suggested that every roll pair be completely equipped with an individual adjusting device as well as protection against foreign bodies, and the majority of rolls of each roll pair have different rotating speeds (a differential), wherein the respective roll pairs located on top preferably have a moving-out device which is jointly controlled.

The monitoring and servicing work is facilitated if the rolls of a roll pair are arranged in a horizontal plane.

In a continuation of the inventive idea, another great advantage can be gained for the entire system if the grain mill is conceived as a compact mill and comprises a compact cleaning arrangement, at least two eight-roll mills and a large plansifter.

Disadvantages are often seen in the concentration of work sequences. However, in the case of the new grain mill, it has been shown that a meaningful concentration increases the ease of monitoring and allows the possibility for a more rapid reaction. The management of the mill is accordingly facilitated even though the same standards of quality as in the prior art can be achieved in the overwhelming number of cases of application. The degree of complexity of the milling diagram was considerably reduced. The new inventive ideas also offer an improved basis for a meaningful additional increase in the degree of automation in that the grinding gap adjusting device is assigned in each instance to a remote control and computer means for storing and retrieving the specific grinding gap adjustments for every grinding task as well as all other adjusting values of the processing and transporting means.

If the raw material is known, as well as the rest of the parameters such as ambient temperature, air humidity, the state of all units (corrugation of the rolls, screening tension of the plansifters, etc.), the mill can be operated completely automatically over a longer period of time, even without the immediate presence of trained personnel, after a onetime accurate adjustment. The new invention accordingly allows a great contribution to be made to the improvement of advanced milling, not by additionally complicating it, but rather by simplifying it—virtually without curtailing the participation of the miller.

The invention is explained in more detail in the following.

BRIEF DESCRIPTION OF DRAWINGS

In the drawings,

FIG. 6 shows the grinding and sifting schematically with an additional embodiment example.

DESCRIPTION OF THE PREFERRED EMBODIMENTS

Figure 1:
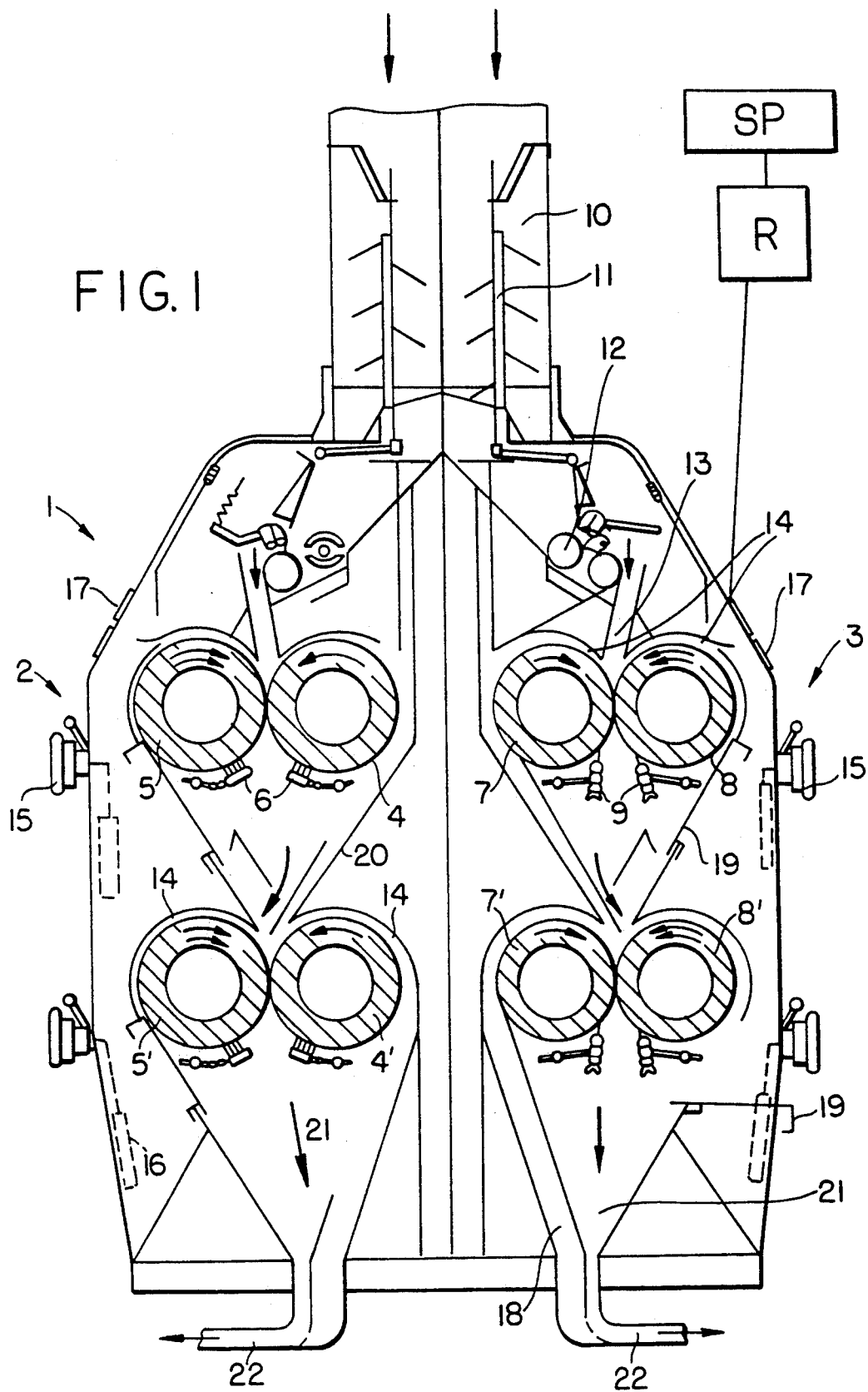
FIG. 1 shows an eight-roll mill in cross-section

Reference is now made to FIG. 1. The eight-roll mill 1 comprises two halves, the left half is shown as a bruising pass 2 and the right half is shown as a second reduction pass 3. The bruising pass 2 usually has corrugated rolls 4 and 5, respectively, wherein the roll 5 which runs more rapidly is designated in the drawing with two arrows. A wiping brush 6 is located below each roll 4 and 5. Rolls 7 and 8, respectively, which are smooth for the most part, are used in the second reduction passes, and wiping blades 9 are used for keeping the surface of the rolls clean. Depending on the specific grinding operation, the respective lower roll pair 4', 5' or 7', 8', respectively, will be the same roll type, coarse corrugation, fine corrugation, or will be constructed as a smooth roll, as the corresponding upper roll.

The material is guided to the left or to the right into the roll mill 1 via a feed cylinder 10. Only with very large milling capacities is it indicated to construct the left-hand and right-hand roll mill halves identically in such a way that each half must process one half of the product volume. In the drawing, a sensor 11 in the feed cylinder 10 is designed as a so-called "Christmas tree" which controls a product feed 12, so that an arriving quantity of material, which flows into the feed cylinder 13 at the top, is discharged in the same magnitude by means of the product feed. The material is guided directly into the grinding gap via a feed duct 13. A strong air current is generated in the feed duct 13, which can be ensured in an advantageous manner by means of two air ducts 14 which are guided around the rolls 4, 5 and 7, 8, respectively. The material which is bruised by the upper roll pair 4, 5 is guided directly into the grinding gap of the lower roll pair 4', 5' via a product outlet funnel 20. The air also aspirates through the air ducts 14 at the lower roll pair 4', 5'. A transfer unit 22 transfers the material to be milled to the intermediate lift-overs by means of a product outlet funnel 20. All four roll pairs 4, 5 - 4', 5' - 7, 8 - 7', 8' can be adjusted with respect to the grinding gap by means of an adjusting device 15.

All other devices, such as the means for protecting against foreign bodies, the engaging and disengaging device, etc. are used in the same manner as in standard four-roll mills. In this connection, reference is made to DE-PS No. 27 30 166 in its entirety. It has been shown that the constructional unit for the roll pair which is shown in the aforementioned publication of the present Applicant can also be used to great advantage with the eight-roll mills, so that when eight-roll mills are combined with four-roll mills the same basic construction of the so-called roll package can be taken as a basis in every case, which is an additional advantage for both the manufacturer and the user.

In individual cases, it can be indicated to provide a feed roll or product distribution roll, respectively, above the lower roll pair. However, it is preferable that the engagement and disengagement of the roll be effected for both roll pairs by means of the same sensor 11.

The right half of the drawing also shows an air path 18 in the product outlet funnel. This can be advantageous particularly with milling materials of the middlings and flour types, since a more compact guiding of the falling stream of material is made possible by means of separate air and product paths.

Every grinding roll pair (4, 5 - 7, 8) comprises its own grinding gap adjusting device which consists of a handwheel 15 and the corresponding adjusting elements. In addition, a motor-driven adjusting device 16 can be provided, wherein both can monitor the instantaneous distance variable between the two grinding rolls via a display 17. Moreover, the motor-driven adjustment can be effected automatically by means of computers (R) and storage means 58.

In addition, a control gate 19, which is shown in the right half of the drawing in the closed position at the top and in the opened position at the bottom, is assigned to each grinding roll pair. The control gate can be opened regardless of whether or not the roll mill is operating. Constant air pressure conditions and, accordingly, constant grinding conditions, are thereby maintained by means of the additional air ducts 14, 18 described above.

Figure 2:
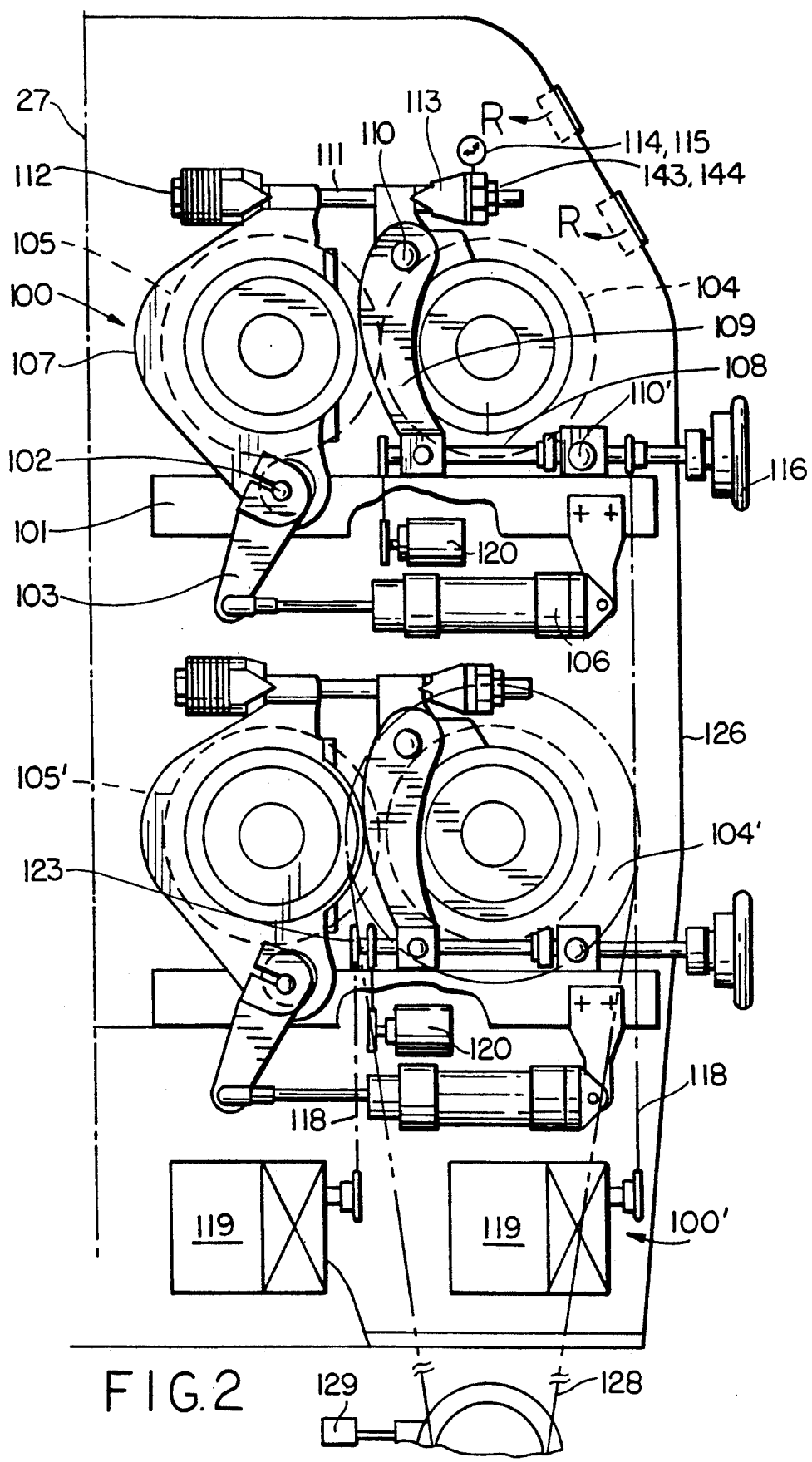
FIG. 2 shows a view in partially schematic form of the drive and adjusting means of FIG. 1.

Reference is made in the following to FIG. 2 which shows adjusting members as a constructional assembly 100 and a controllable adjusting drive 100'. The two grinding rolls 104 and 105 are supported on a mutual carrier 101. The movable roll 105 is fastened at a stationary eccentric pin 102 so as to be swivelable, wherein the inward and outward movement is controlled by means of a corresponding lever 103, as well as a disengagement cylinder 106. The eccentric pin 102 is rotated by means of the swiveling movement of the lever 103 and causes a horizontal displacement of the lower portion of a swivelable bearing housing 107, so that the spacing of the two grinding rolls can be pre-adjusted. This device would be less suited for exact adjustment of the grinding rolls. This is only used for bringing the grinding rolls into a moved-in or moved-out position or into two fixed positions, respectively. The actual fine adjustment of the grinding rolls 104 and 105 is effected via an adjusting spindle 108 which directly moves an adjusting arm 109 around a stationary pivot bearing 110 by means of rotation. The upper, shorter end of the adjusting arm 109 is connected with the swivelable bearing housing 107 in a force-locking manner via a tie rod 111. The transmission of force is effected via knife edges which are part of an overload spring protection device 112 on one side. On the opposite side, an adjustable pressure head 113 and a pressure measuring device 114 with pressure display apparatus 115 are arranged at the tie rod 111. In order to be able to adjust the grinding rolls so as to be parallel during servicing operations, a correction can be effected on the respective necessary side via adjusting screws 143, 144. The adjusting spindle 108 is held so as to be stationary by means of the bearing 111' and can now be actuated via a handwheel 116, which has a display clock built directly into it, or by means of a motor-driven arrangement, transmission chain 118 and a gear motor or drive motor 119, respectively. The drive motor 119 is fastened at the roll mill 126 and communicates directly with the adjusting spindle 108 via a slip clutch and a chain wheel 123.

In addition, a position indicator 120 is directly connected with the adjusting spindle 108, so that every movement of the chain wheel 123 and handwheel 116, respectively, is recorded in the position indicator 120 and guided further to the desired positions. In FIG. 2, in addition, a drive belt 128 for the drive of the grinding rolls 104 and 105, 104' and 105', respectively, is only shown in a suggestive manner. It is possible also to provide an electric power requirement measuring and display device 129 in the drive system. The electric power consumption can accordingly be defined at a lower and upper value, for example, and e.g. the grinding rolls can be moved apart when the preselected range is exceeded.

All signals of a roll mill are preferably coordinated and controlled via a machine computer R, wherein the machine computer can retrieve the necessary desired values from a central computer with storage Sp. The position indicator is preferably equipped with a position limiting value switch which is adjustable to preselectable limiting values and can impede an automatic faulty adjustment in this way. A position limiting value switch has the advantage that a faulty manual adjustment can also be prevented accordingly, since both the handwheel and the automatic adjustment result in a corresponding distance displacement of the chain 118. In the same way as the adjusting motor 119, the position indicator 120 can be connected with an input-output device which receives and transmits corresponding signals from the machine computer, corresponding to the digital display and manual input keys. In the same way, the pressure measuring and display device 114, 115 can be connected to the machine computer. Depending on the degree to which a roll mill can be expanded, one or more protection devices can be provided at the same roll mill. If, for example, corrugated rolls are installed, monitoring of the grinding pressure is less important; on the other hand, the monitoring of the spacing of the grinding rolls, whether this be effected by means of the position indicator or a distance measuring device, is advantageous. The opposite applies to smooth rolls in which a monitoring of pressure is more advantageous. A computer and the signal lines, which are indicated in a suggestive manner, are supposed to indicate that the computer and storage, respectively, control an entire range of roll mills in a mill, possibly all of them, and, if necessary, also coordinate control functions.

In addition, it has proven to be especially advantageous that the digital display transmit a value corresponding to a time measurement (clock 05:50) and preferably transmits an identical value corresponding to a position indicating apparatus or display clock of the handwheel, respectively.

The great advantage consists in that the experimental values of roll mills which are not automated and not remote-controllable are compared and can be evaluated for constructing or improving corresponding control programs.

Figure 3:
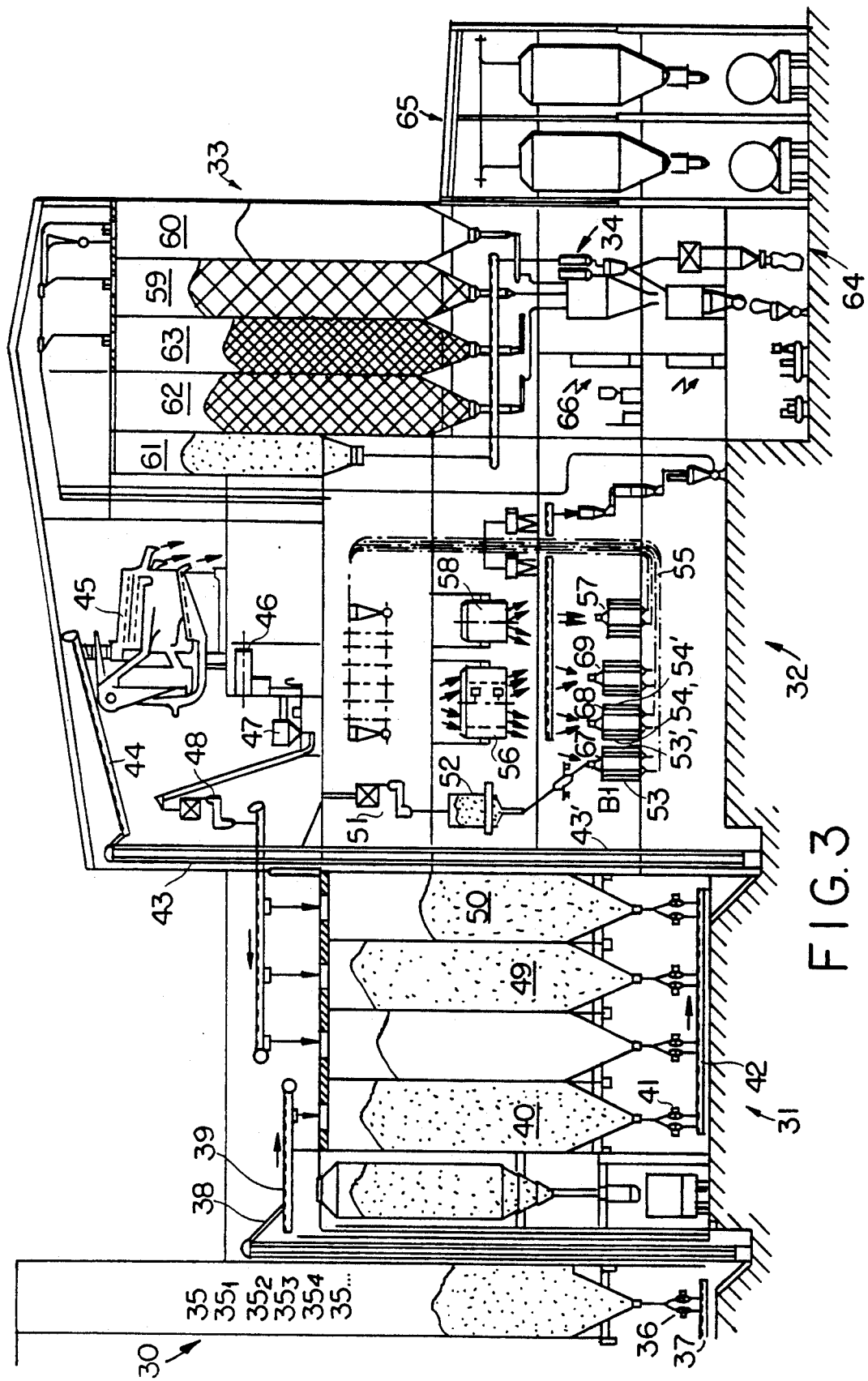
FIG. 3 shows a new grain mill in schematic form in accordance with the invention.

FIG. 3 shows a complete grain mill in a greatly simplified manner. In a very rough manner, the starch mill comprises a storage silo 30 for the stored grain, mixing and holding boxes 31, an actual processing wing 32, and finished product cells 33. Subsequent to the finished product cells 33, the finished products are delivered directly via a scale system 34.

In particular, the work sequence proceeds as follows: The desired mixture of raw grain is provided from storage cells 35, $35_1$, $35_2$, $35_3$, etc. and conveyed into a mixing cell 40 via trolleys 36, a horizontal conveyor 37, an elevator 38, and another horizontal conveyor 39.

The grain, which has still not been cleaned, is removed from the mixing cell 40 and conveyed into the grain cleaner 44 via a scale 41, a horizontal conveyor 42 and an elevator 43. Large extraneous constituents (scalpings) are sifted out, stones are sorted out and hull parts are aspirated away in a compact cleaning apparatus 45. (Reference is made to CH-PA No. 04 626/87-6 of the present Applicant in its entirety.) Subsequently, the material is delivered to a trieur 46, in which long and round extraneous seed materials are removed, dirt adhering to the kernel material is removed by means of a scouring machine 47, the required quantity of water is added in an intensive wetting device 48 and the material is stored in a holding cell 49 for the necessary period of time. The grain which has been wetted and let stand for approximately 12 to 48 hours, is removed from one of the holding cells 49 and 50, respectively, lifted over by means of an elevator 43' and, after the addition of 0.1 to 0.3% water (wetting 51 before $B_1$) and a homogenization cell 52, is fed directly to the first grinding pass ($B_1$) or the first double-grinding pass 53, respectively.

In order to grind, the material is guided via double-grinding passes 53, 53', 54, 54', etc., wherein the material is delivered to the sifting divisions of a large plansifter 56 after every double grinding by means of a pneumatic conveying system 55. The so-called rear grindings are formed as single grindings 57, as was previously the case. From the latter, the material is delivered to a plansifter 58 of a size conventional in the prior art after passing a roll pair of a corresponding four-roll mill. The finished products resulting from the grinding and the large plansifter 56, respectively, and the plansifter 58 and the other screening and sifting units used in the mill, such as the semolina cleaning machine, etc., respectively, are stored in cells 59, 60, 61, 62, 63 and delivered as needed via a scale 34. The finished products can be prepared for shipping via a sacking station 64 or via tank car loading 65. The entire system is guided by the chief miller from a central control unit with all necessary computer means.

Another interesting advantage consists in that large sifters with specifically larger screening surfaces, e.g. 30 to 60% larger than in the screening surfaces after the four-roll mills, can be used subsequent to the double-grinding passes, so that a concentration of the work output is made possible here as well.

According to present estimations, a total of 10 to 40% of space and machine outfit can be saved with the new invention with respect to the plansifters and roll mills; this can be done without the disadvantage of new unknown grinding principles while maintaining mill throughput and end product quality. The energy consumption can also be reduced considerably.

Figure 4:
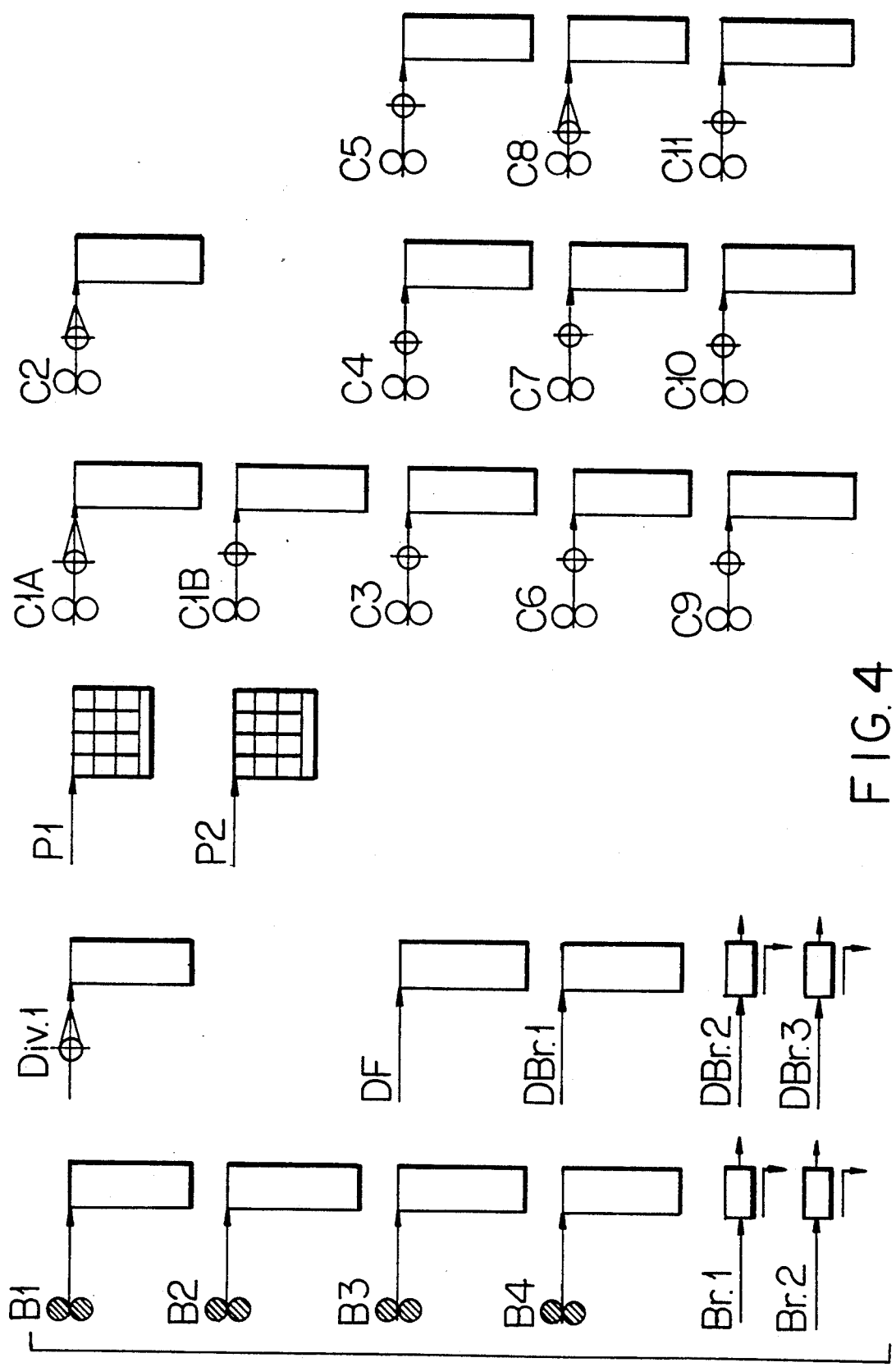
FIG. 4 shows a grinding and sifting diagram corresponding to the prior art.

FIG. 4 shows the diagram of a standard grain mill corresponding to the prior art. The simple bruising passes ($B_1$, $B_2$, $B_3$, $B_4$) are shown by symbolic roll pairs in the hatched area. This means that these rolls are constructed as corrugated rolls.

After every individual grinding ($B_1$ and $B_2$, respectively, etc.), the resulting bruised grain is transferred every time to a sifting pass for the purpose of dividing it into different granulations. A portion of the tailings $B_3$ and $B_4$ is guided via the bran brushes $DBr._1$, $DBr._2$ in order to clean the hulls. The siftings from the bran brushes $Br_1$ and $Br_2$, respectively, are taken over by $DBr._1$ and $DBr._2$ and divided into flour and bran. The siftings from $DBr._3$ are cleaned in the special plansifter division $DBr._1$. All of the filtered flour is correspondingly sifted out from the pneumatic conveyors onto the plansifter division DF. Individual tailings from $B_1$ and $B_2$ are cleaned directly in the semolina cleaning machines $P_1$ and $P_2$, respectively.

The reduction passes $C_1$ to $C_{11}$ take over the tailings or siftings from $Div._1$, $P_1$ and $P_2$. In accordance with the bruising passes, the material to be milled is guided into the corresponding subsequent sifter divisions after every individual grinding also in the reduction passes. The product flow is guided according to the increasing number 1, 2, 3, etc., from the first grinding pass to the first sifting pass, second grinding pass to the second sifting pass, etc. All siftings in all sifting passes can be removed as finished flour.

In the reduction passes, a detacher (for detaching the flakes), which is designated by a circle, or a special detacher for intensive detaching (circle with cone), is used between the actual roll grinding and the sifter.

Figure 5:
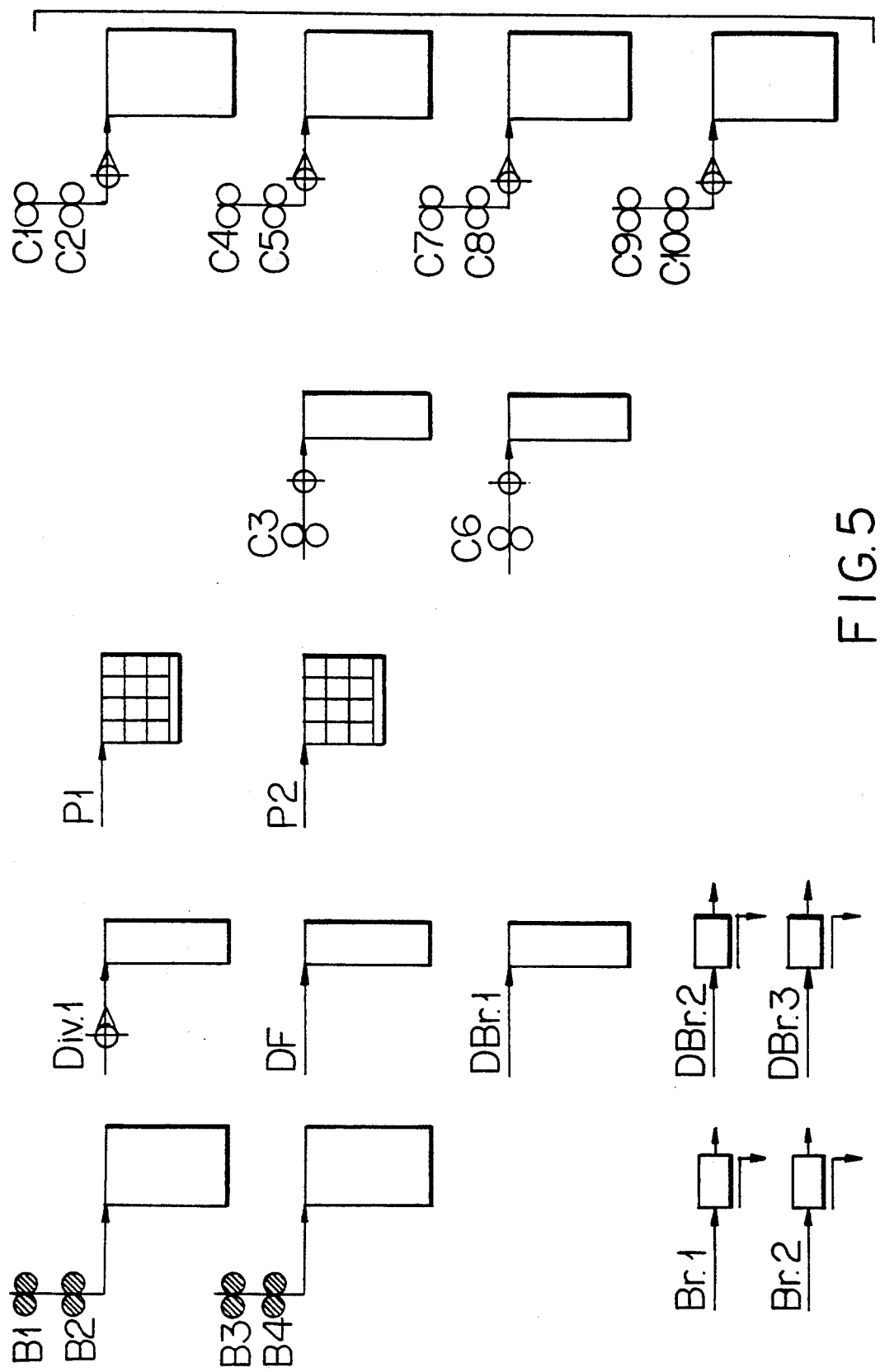
FIG. 5 shows an example of a new grinding and sifting diagram in accordance with the invention.

The diagram in FIG. 5 shows in itself the same size mill, with respect to function and mill throughput capacity, as in FIG. 4, wherein FIG. 5 is the new solution and FIG. 4 is, by way of comparison, the prior art.

The two roll pairs, which are arranged one below the other, constitute a double grinding in FIG. 5. $B_1$ and $B_2$, the first two bruising passes, are combined to form the first double grinding 53. $B_3$ and $B_4$ constitute the second double-grinding pass 53'. The first and second double-grinding passes are comprised in a first eight-roll mechanism 67 corresponding to FIG. 3. In a corresponding sense, the reduction passes $C_1$, $C_2$, $C_4$ and $C_5$ constitute the eight-roll mechanism 68, the reduction passes $C_7$, $C_8$, $C_9$ and $C_{10}$ constitute the eight-roll mechanism 69. Only the reduction passes $C_3$ and $C_6$ are constructed as single-grinding passes in the same way as in FIG. 4, that is, the prior art, and together form a four-roll mechanism 57 corresponding to FIG. 3.

Of course, the diagram of FIG. 5 is only a preferred embodiment example of which a very large number of variations are possible, as mentioned in the beginning, within the framework of the new invention. However, a rough consideration of FIG. 4 and FIG. 5 shows the great simplification which is made possible with the new inventive ideas in a very distinct manner.

FIG. 6 is referred to in the following. FIG. 6 shows the combination of double-grinding passes and single-grinding passes. The double-grinding passes $B_1/B_2$ and $C_1/C_2$ are comprised in a single eight-roll mechanism 70. A conveyor line 140 brings the milling material of the first double grinding $B_1/B_2$ to the first large sifter division 73. The third bruising $B_3$, as well as the fourth bruising $B_4$, are ground in a single-grinding pass in a 4-roll mill 142. Lift-overs 143 and 144, respectively, bring the third and fourth bruised grain material, respectively, to the corresponding sifter divisions 145 and 146, respectively. The first two reduction passes $C_1$ and $C_2$ are executed in turn as double grindings. The material resulting from $C_2$ is guided into the second large sifter division 74 via a pneumatic transporting line 142. The reduction passes $C_3$ and $C_4$ are formed in turn as single-grinding passes (four-roll mill 151) and the corresponding products are conveyed by lift-overs 147 and 148, respectively, into the corresponding third and fourth sifter divisions 149 and 150, respectively. The following reduction passes, like the rear bruising passes, not shown, can be constructed according to the specific requirements of the mill, be this as double- or single-grinding passes. The large-surface area sifters 73, 74, etc. can be comprised in a special large plansifter 152, the sifter divisions 145, 146, 149, 150 are likewise comprised in a plansifter 153 corresponding to the state of the art.

While the foregoing description and drawings represent the preferred embodiments of the present invention, it will be obvious to those skilled in the art that various changes and modifications may be made therein without departing from the true spirit and scope of the present invention.

What is claimed is:

1. In a grain mill for producing milled grain products such as flour, semolina and middlings with a system of advanced milling having a plurality of single grinding passes with roll pairs and subsequent sifting passes with plansifters and sifter divisions respectively, the improvement comprising:

two grinding roll pairs arranged sequentially without sifting therebetween, thereby defining a double-grinding pass, and means for sifting directly following said double grinding pass, said grain mill employing a plurality of double grinding passes and single grinding passes in combination with a sifting pass being arranged after each double grinding pass or each single grinding pass, respectively, and wherein two double grinding passes are constructed as an 8-roll mill unit, each of said two double grinding passes having two grinding roll pairs located one on top of the other.

2. Grain mill according to claim 1, wherein said grain mill comprises eight-roll mills and 4-roll mills.

3. Grain mill according to claim 1, wherein said grain mill comprises at least two eight-roll mills.

4. Grain mill according to claim 1 wherein two upper and two lower roll pairs are provided in an eight-roll mill wherein an adjustable feed regulating device is provided for each upper roll pair, and a funnel-shaped product guide is arranged at each lower roll pair for directly transferring ground material from the respective upper roll pair.

5. Grain mill according to claim 1, wherein grinding gap adjusting devices and a control gate for removing samples after every grinding pass are assigned to each roll pair.

6. Grain mill according to claim 1, wherein the feed space of the upper roll pair as well as the feed space of the lower roll pair are connected to an aspirating arrangement via ducts.

7. Grain mill according to claim 1, wherein every roll pair is completely equipped with individual adjusting device, as well as protection against foreign bodies, and the rolls of each roll pair have different rotating speeds, wherein the roll pairs located one on top of the other preferably comprise a moving-out device which is controlled jointly.

8. Grain mill according to claim 1, wherein the rolls of a roll pair are arranged at the same vertical height.

9. Grain mill according to claim 1, wherein said grain mill comprises a compact cleaning apparatus, at least two eight-roll mills and a large plansifter.

10. Grain mill according to claim 1, wherein the grain mill comprises double-grinding passes and single-grinding passes, wherein screening surfaces, which are 6 to 50% larger on the average compared with screening surfaces of the single-grinding passes, are assigned to the double-grinding passes.

11. Grain mill according to claim 1, wherein said grinding gap adjusting device is assigned in each instance to a remote control and computer means for storing and retrieving the specific grinding gap settings for all grinding tasks.

* * * * *